UNITED STATES PATENT OFFICE.

EDWARD W. PARNELL, OF LIVERPOOL, COUNTY OF LANCASTER, ENGLAND, ASSIGNOR OF ONE-HALF TO JAMES SIMPSON, OF SAME PLACE.

MANUFACTURE OF ALKALIES.

SPECIFICATION forming part of Letters Patent No. 283,508, dated August 21, 1883.

Application filed July 9, 1883. (No specimens.) Patented in England October 21, 1878, No. 4,188.

*To all whom it may concern:*

Be it known that I, EDWARD WILLIAM PARNELL, a subject of the Queen of Great Britain, residing at Liverpool, in the county of Lancaster, England, have invented a certain new and useful Improvement in the Manufacture of Alkalies, (for which I have received Letters Patent in Great Britain, No. 4,188, dated October 21, 1878, and nowhere else;) and I do hereby declare that the following is a full, clear, and exact description of the invention, which will enable others skilled in the art to which it appertains to use the same.

Crude or impure alkaline solutions obtained in the manufacture of alkalies by the Leblanc process are invariably contaminated with sulphurets, and before the date of my invention no commercially successful method of eliminating the said sulphurets was in operation. By "crude or impure alkaline solutions" I mean solutions mainly of carbonates of potash or soda, commonly called "vat-liquors," and by a "solution of caustic alkali" I mean a solution of caustic soda or potash in water. The object is to purify the said crude or impure alkaline solutions and render them, to a great extent, free from the said sulphurets by a cheap and efficient method of treatment.

My invention consists, essentially, in adding to the crude or impure alkaline solutions above mentioned zinc or zinc oxide, or both, dissolved by boiling in a solution of caustic alkali of about 40° Twaddell. The sulphurets in the crude solutions combine with the zinc and a precipitate of zinc sulphuret is formed, and the supernatant purified alkaline solutions, to a large extent freed from sulphurets, are drawn off and treated in the usual or any desired way.

In practice it is generally preferable to dissolve metallic zinc, instead of oxide of zinc, in the solution of caustic alkali, as impure metallic zinc dissolves freely, and a common variety of zinc, known as "rough" or "hard" spelter, may be used with advantage. Oxide of zinc, on the other hand, must be pure, or nearly pure, or else it is not freely dissolved.

In making the solution I use an iron vessel provided with a false bottom or grid on which is laid zinc in the form of blocks or plates. A solution of caustic alkali in water of about 40° Twaddell is then poured into the vessel until the zinc is covered, and heat is applied by means of steam or products of combustion until the solution of caustic alkali is made to boil. After boiling for some hours the liquid assumes an oily consistency and is ready for use. The zinc dissolved in the solution of caustic alkali is then added to the crude or impure alkaline solutions until almost, but not quite, all the sulphurets are precipitated. About twenty-five pounds of zinc in solution will purify about one ton of caustic alkali containing sixty per cent. of alkali.

I am aware that it has been attempted to free crude or impure alkaline solutions from sulphurets by adding directly thereto zinc or zinc oxide in the natural state. These attempts have proved failures on account of the slowness and want of uniformity of the action. By previously dissolving the zinc or zinc oxide, or both, in a solution of caustic alkali I am enabled to add the precipitant in a liquid form, and the action is rapid, uniform, efficient, and satisfactory.

I claim—

Treating crude or impure alkaline solutions made according to the Leblanc process with a solution consisting of zinc or zinc oxide, or both, dissolved in a solution of caustic alkali, substantially as set forth.

E. W. PARNELL.

Witnesses:
    E. T. DUFFIELD,
    J. JOHNSON.